United States Patent
Tsunoda et al.

(10) Patent No.: US 7,968,629 B2
(45) Date of Patent: Jun. 28, 2011

(54) FLAME RETARDANT POLYAMIDE RESIN COMPOSITION AND MOLDED ARTICLE

(75) Inventors: Morio Tsunoda, Hiratsuka (JP); Yasushi Yamanaka, Hiratsuka (JP)

(73) Assignee: Mitsubishi Engineering-Plastics Corporation, Tokyo (JP)

( * ) Notice: Subject to any disclaimer, the term of this patent is extended or adjusted under 35 U.S.C. 154(b) by 100 days.

(21) Appl. No.: 12/293,022

(22) PCT Filed: Mar. 12, 2007

(86) PCT No.: PCT/JP2007/000207
§ 371 (c)(1),
(2), (4) Date: Feb. 19, 2009

(87) PCT Pub. No.: WO2007/108202
PCT Pub. Date: Sep. 27, 2007

(65) Prior Publication Data
US 2009/0312468 A1      Dec. 17, 2009

(30) Foreign Application Priority Data
Mar. 17, 2006   (JP) ................................. 2006-074194

(51) Int. Cl.
*C08K 5/3492*      (2006.01)
(52) U.S. Cl. ........ 524/100; 524/101; 524/126; 524/133; 524/404; 524/405
(58) Field of Classification Search ............ 524/99–101, 524/126, 133, 404, 405
See application file for complete search history.

(56) References Cited

U.S. PATENT DOCUMENTS

| | | | |
|---|---|---|---|
| 4,866,114 A * | 9/1989 | Taubitz et al. | 524/100 |
| 4,997,612 A * | 3/1991 | Gianchandai et al. | 264/211 |
| 6,599,446 B1 * | 7/2003 | Todt et al. | 252/511 |
| 2006/0111548 A1 * | 5/2006 | Elkovitch et al. | 528/205 |
| 2006/0167143 A1 * | 7/2006 | Borade et al. | 524/115 |
| 2009/0275682 A1 * | 11/2009 | Furukawa et al. | 524/126 |

FOREIGN PATENT DOCUMENTS

| | | |
|---|---|---|
| JP | 62-209165 | 9/1987 |
| JP | 63-27557 | 2/1988 |
| JP | 8-134347 | 5/1996 |
| JP | 2004-99614 | 4/2004 |
| JP | 2005-240035 | 9/2005 |

OTHER PUBLICATIONS

International Search Report for PCT/JP2007/000207, mailed May 1, 2007.

* cited by examiner

*Primary Examiner* — Peter Szekely
(74) *Attorney, Agent, or Firm* — Nixon & Vanderhye P.C.

(57) ABSTRACT

A flame retardant polyamide resin composition having excellent extrudability and moldability, being free of generating a highly corrosive hydrogen halide gas upon combustion, exhibiting very high flame retardancy, having excellent mechanical properties and electrical properties and being suited for use in electrical and electronic parts and parts for automobile electrical equipments, and a molded article thereof are provided. A polyamide resin composition comprising 100 parts by weight of an aliphatic polyamide resin (A) having a viscosity number of 70 to 200 ml/g, 0.1 to 30 parts by weight of a polyphenylene ether-based resin (B), and 5 to 100 parts by weight of flame retardant agent (C) comprising at least the following components (a), (b) and (c); (a) a reaction product of a melamine and a phosphoric acid, (b) a phosphinic acid salt and/or a diphosphinic acid salt, and (c) a metal salt of boric acid, wherein a compounding weight ratio (a):(b):(c) of the flame retardant agent components is 1:(0.5 to 2.5):(0.01 to 1).

18 Claims, No Drawings

1

FLAME RETARDANT POLYAMIDE RESIN COMPOSITION AND MOLDED ARTICLE

This application is the U.S. national phase of International Application No. PCT/JP2007/000207, filed 12 Mar. 2007, which designated the U.S. and claims priority to Japan Application No. 2006-074194, filed 17 Mar. 2006, the entire contents of each of which are hereby incorporated by reference.

TECHNICAL FIELD

The present invention relates to a flame retardant polyamide resin composition and a molded article, and more particularly, to a flame retardant polyamide resin composition having excellent extrudability and moldability, showing much reduced mold deposits during a molding operation and less bleeding-out of a flame retardant, being free of generation of a highly corrosive hydrogen halide gas upon combustion, exhibiting very high flame retardancy, and having excellent mechanical properties and electrical properties, and a molded article which comprises the polyamide resin composition.

BACKGROUND ART

Polyamide resins, which are excellent in mechanical strength and heat resistance, have been hitherto used in the fields of automobile parts, mechanical parts and electrical and electronic parts. In the field of electrical and electronic parts especially, the required level of flame retardancy becomes higher and higher. Therefore, polyamide resins are required to exhibit higher level of flame retardancy than their inherent self-extinguishing property. A number of investigations have thus far been made to obtain a high level of flame retardancy, to be more specific, to develop a material which is rated V-0 level under the UL94 standard from Underwriters Laboratories. In particular, even in the case of compositions compounded with an inorganic filler, there is a strong demand for development in which a non-halogen type flame retardant is used according to the trends of the time. In such applications, in particular, in applications for various kinds of breakers that are generally connected to electric wirings, such as a safety breaker, an ampere breaker, a ground-fault interrupter, a circuit breaker, MCCB (molded case circuit breaker), NFB (no-fuse breaker), a motor protecting breaker (motor breaker), a slim breaker (one-touch breaker or one-touch breaking breaker), etc., requirements for glow wire characteristics and tracking resistance characteristics which are typical standard of European IEC become higher and higher in relation to safety assurance of electric wirings.

A polyamide resin composition which contains a melamine cyanurate and/or a derivative thereof and an inorganic filler and which is alleged to have good mechanical properties, thermal characteristics and flame retardancy is proposed (Patent Document 1). The composition, however, has flame retardancy of V-2 level under the UL94 standard. No resin compositions having higher flame retardancy, namely of V-1 level or higher are proposed.

A flame proof thermoplastic molding material which contains a melamine cyanurate and, compounded therein, a glass fiber having a determined distribution of the length of the glass fiber, in particular a short glass fiber and which is alleged to have excellent mechanical property and flame proofing property is proposed (Patent Document 2). The most of the specifically proposed resin compositions, however, have flame retardancy of V-2 level (at a thickness of 1/16 inch) under the UL94 standard. There is no mention at all of tracking characteristics, extrudability, moldability or appearance of molded articles.

A proposal is made for a flame retardant containing a first component (component comprising a phosphinic acid salt having a specific structure and/or a diphosphinic acid salt having a specific structure and/or a polymer of thereof) and a second component (a melamine condensate and/or a reaction product of a melamine with a phosphoric acid and/or a reaction product of a melamine condensate with a phosphoric acid and/or a mixture thereof) and for flame proofing of a thermoplastic polymer (Patent Document 3). More concretely, a polyamide resin composition which comprises a reinforced polyamide resin comprising 30% by weight of a glass fiber and, compounded therein, a flame retardant composed of a phosphinic acid salt (first component) and a melamine polyphosphate (second component) is proposed The polyamide resin composition has flame retardancy of V-0 level (at a thickness of 1/16 inch) under the UL94 standard. However, there is no description at all concerning other properties such as moldability, mechanical properties and electrical properties of the polyamide resin composition.

A flame retardant polyamide resin composition compounded with the above-described flame retardant (containing the first and second components each in an amount of 1 to 30% by weight) and 5 to 40% by weight of an inorganic filler (glass fiber, wollastonite, talc, calcined kaolin, mica, etc.) is proposed (Patent Document 4). More concretely, there is proposed a polyamide resin composition comprising 20% by weight or 30% by weight of a glass fiber which is capable of exhibiting flame retardancy of V-0 level (at a thickness of 1/32 inch) under the UL94 standard and tracking property in terms of CTI of 550 to 600 V. It is also proposed that a flame retardant aid such as magnesium hydroxide, aluminum hydroxide, zinc sulfide, iron oxide, boron oxide and zinc borate may be compounded in the composition. However, there is no description concerning the compounding amount and the effect obtained by the addition of such a flame retardant aid. Further, there is shown no concrete proposal as to a resin composition containing the flame retardant aid.

It is pointed out that the above flame retardant is problematic with respect to foaming of strands and generation of a large amount of gases during extrusion, occurrence of mold staining (mold deposits) during a molding process, and reduction of fluidity and mold releasability (Patent Document 4). A re-test performed by the present inventors has revealed that the proposed resin composition, in which the above-mentioned flame retardant (comprising the first and second components each in an amount of 1 to 30% by weight) and 5 to 40% by weight of an inorganic filler are compounded, cannot solve these problems and that a further technical improvement is required. It has been also revealed that when a molded article obtained using the proposed resin composition is exposed to a high temperature and high humidity atmosphere, the flame retardant bleeds out from the surface thereof to cause problems such as surface roughening of the molded article and deterioration of the flame retardancy.

A combined flame retardant and stabilizing agent for thermoplastic polymers is proposed which comprises 20 to 80% by weight of (A) a phosphinic acid salt and/or a diphosphinic acid salt and/or a polymer thereof (corresponding to the first component disclosed in Patent Document 3), 10 to 75% by weight of (C) a phosphorus/nitrogen flame retardant (corresponding to the second component disclosed in Patent Document 3), and further 10 to 75% by weight of (B) a nitrogen-containing synergist (Patent Document 5). It is alleged that a thermoplastic resin composition obtained by compounding the above flame retardant and stabilizing agent into a thermoplastic resin exhibits good glow wire stability and that when a zinc compound (such as zinc borate, zinc oxide or zinc stannate) is preferably additionally compounded therein, stability during processing is also improved. It has been found as a result of a study made by the present inventors, however, that such a resin composition still fails to solver in a sufficient manner, problems of deterioration of the appearance of molded articles, due to generation of gases during a molding process and bleeding-out of the flame retardant, staining of the molds and the like.

Patent Document 1: Japanese Patent Application Laid-Open (KOKAI) No. 54-16565 (1979)

Patent Document 2: Japanese Translation of PCT International Application No. 11-513059 (1999)

Patent Document 3: Japanese Patent Application Laid-Open (KOKAI) No. 2001-72978

Patent Document 4: Japanese Patent Application Laid-Open (KOKAI) No. 2004-292755

Patent Document 5: Japanese Patent Application Laid-Open (KOKAI) No. 2005-240035

DISCLOSURE OF THE INVENTION

Problems to be Solved by the Invention

It is an object of the present invention to provide a flame retardant polyamide resin composition having excellent extrudability and moldability, showing much reduced mold deposits during a molding operation and bleeding-out of a flame retardant, being free of generation of a highly corrosive hydrogen halide gas upon combustion, exhibiting very high flame retardancy, and having excellent mechanical properties and electrical characteristics; and a molded article which comprises the polyamide resin composition.

Means for Solving the Problems

As a result of the present inventors' earnest study, it has been found that when a specific aliphatic polyamide resin, a specific flame retardant agent and a polyphenylene ether-based resin are blended in specific proportions, bleeding-out of the flame retardant agent and staining of a mold (mold deposits) can be suppressed. It has been also found that when a metal salt of boric acid or a combination of a metal salt of boric acid with a melamine cyanurate compound is compounded, the flame retardancy and glow wire property can be further improved. Further, it has been found that a resin composition in which an inorganic filler is compounded in such a high concentration that would generally cause deterioration of the flame retardancy can ensure high flame retardancy of V-0 level under the UL94 standard.

Thus, in the first aspect of the present invention, there is provided a flame retardant polyamide resin composition comprising 100 parts by weight of an aliphatic polyamide resin (A) having a viscosity number of 70 to 200 ml/g, 0.1 to 30 parts by weight of a polyphenylene ether-based resin (B), and 5 to 100 parts by weight of a flame retardant agent (C) comprising at least the following components (a), (b) and (c):
(a) a reaction product of a melamine and a phosphoric acid,
(b) a phosphinic acid salt represented by the general formula (I) shown below and/or a diphosphinic acid salt represented by the general formula (II) shown below, and
(c) a metal salt of boric acid,
wherein a compounding weight ratio (a):(b):(c) of the flame retardant agent components is 1:(0.5 to 2.5):(0.01 to 1),

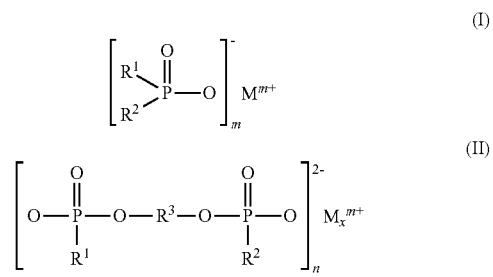

(wherein $R^1$ and $R^2$ are the same or different and each represent linear or branched $C_2$ to $C_6$ alkyl and/or $C_6$ to $C_{10}$ aryl, $R^3$ represents linear or branched $C_7$ to $C_{10}$ alkylene, $C_7$ to $C_{10}$ arylene, $C_7$ to $C_{10}$ alkylarylene or $C_7$ to $C_{10}$ arylalkylene, M is Ca, Mg, Al or Zn, m is a valence of M, n is 1 or 3 and x is 1 or 2, with the proviso that 2n=mx).

In the second aspect of the present invention, there is provided a molded article comprising the above flame retardant polyamide resin composition.

EFFECT OF THE INVENTION

The polyamide resin composition of the present invention exhibits the following effects.

(1) The composition shows much reduced generation of gases and mold deposits during a molding operation, has excellent extrudability and injection moldability, exhibits very high flame retardancy, is free of generation of a highly corrosive hydrogen halide gas upon combustion and of bleeding-out of a flame retardant, and can retain the quality of products for a long time in a stable manner.

(2) The composition exhibits flame ratings, as measured in accordance with UL94 standard, of V-0 when molded into an article having a thickness of 1/16 inch and V-0 or V-1 when molded into an article having a thickness of 1/32 inch.

(3) The composition has excellent glow wire property which passes the glow wire test performed in accordance with IEC 60695-2-12 standard at 960° C. when molded into an article having a thickness of 1.6 mm.

(4) The composition passes the tracking resistance test performed in accordance with IEC 60112 standard at an applied voltage of 500 V when molded into an article having a thickness of 3 mm and is suited for use as an electrically insulating material.

BEST MODE FOR CARRYING OUT THE INVENTION

The present invention will be described in detail below.
Aliphatic Polyamide Resin (A):

As used herein the term "aliphatic polyamide resin" is intended to refer to a polyamide in which an aliphatic compound or compounds account for at least 50 mol % of all the components constituting the polyamide. As the aliphatic polyamide using such an aliphatic compound or compounds, there may be mentioned, for example, an aliphatic polyamide obtained by the polycondensation of a lactam having a three- or more membered ring, a polymerizable ω-amino acid, or an aliphatic dibasic acid with an aliphatic diamine. Specific examples of the polyamides are as follows.

(1) Polymers obtained by polycondensation of ε-caprolactam, aminocaproic acid, enantholactam, 7-aminoheptanoic acid, 11-aminoundecanoic acid, 9-aminononanoic acid, α-pyrrolidone, α-piperidone or the like; polymers obtained by polycondensation of a diamine such as pentamethylenediamine, hexamethylenediamine, nonamethylenediamine, undecamethylenediamine and dodecamethylenediamine, with a diacarboxylic acid such as adipic acid, sebacic acid, dodecanedioic acid or glutaric acid; copolymers thereof; and mixtures thereof.

(2) Copolyamides obtained by copolymerizing the above-described aliphatic dibasic acids or aliphatic diamines with aromatic dibasic acids or aromatic diamine compounds, such as metaxylylenediamine, terephthalic acid and isophthalic acid, and having an aromatic compound content of not more than 30 mol % based on all the components constituting the polyamide; and mixtures thereof.

(3) Mixtures of the polyamide resins of (1) and (2) above.

(4) Mixtures of homo- or copolyamides, obtained by copolymerizing the above-described aliphatic dibasic acids or aliphatic diamines with the above-described aromatic dibasic acids or aromatic diamines and having an aromatic compound content of greater than 30 mol % based on all the components constituting the polyamide, with the polyamide resins of (1) and/or (2) above, the mixtures having an aromatic compound content of not more than 30 mol % based on all the components constituting the mixtures.

Specific examples of the polyamide of (1) above include polyamides 4, 6, 7, 8, 11, 12, 56, 66, 69, 610, 611, 612, 56/6, 56/66, 6/66 and 6/12. Specific examples of the polyamide of (2) above include polyamide 6/6T, in which 6T is contained in an amount of not more than 60 mol %. Specific examples of the polyamide of (4) above include a mixture of polyamide 6T/6I or polyamide MXD6 with a polyamide resin of (1) and/or (2) above, the mixture having an aromatic compound content of not more than 30 mol % based on all the components constituting the mixture.

From the viewpoint of flame retardancy, mechanical strength and moldability, it is particularly preferred that the polyamide resin used in the present invention be selected from polyamide 6, polyamide 66, copolymers thereof and/or polyamide resins comprising these polyamides as the major components thereof. In this case, the polyamide resins preferably comprise these polyamide units in an amount of at least 80% by weight. It is further preferred that the polyamide resin be a polyamide 6 homopolymer or a polyamide 66 homopolymer from the viewpoint of ensuring moldability. Incidentally, when the proportion of aromatic compound components in the polyamide resin is not greater than 30 mol %, the polyamide can pass the tracking resistance test performed at an applied voltage of 500 V and thus can exhibit excellent tracking characteristics. The terminal ends of the polyamide resin may be capped with a carboxylic acid or an amine compound also in order to control the molecular weight thereof.

The polyamide resin suitably used in the present invention has a polymerization degree in a certain range, namely has a viscosity number in a specific range. The preferred viscosity number, as measured at a temperature of 23° C. for a solution with a concentration of 1% by weight in 96% sulfuric acid, is usually 70 to 200 ml/g, preferably 72 to 180 ml/g. When the viscosity number is at least 70 ml/g, excellent mechanical properties are ensured. When the viscosity number is not greater than 200 ml/g, foaming of strands during an extrusion process may be suppressed so that it is easy to produce pellets of the resin composition of the present invention.

Polyphenylene Ether-Based Resin (B):

The polyphenylene ether-based resin used in the present invention has excellent compatibility with a hereinafter described flame retardant agent (C) and, therefore, can exhibit an effect to prevent the generation of gases and mold deposits during a molding process and the bleeding-out of the flame retardant agent. Such an effect is more significant in the case of the hereinafter described flame retardant agent (C) than in the case of other flame retardants. Especially, the effect to suppress the bleeding-out of the flame retardant agent is remarkable. Additionally, the compounding of the polyphenylene ether-based resin can give an effect to improve mechanical characteristics, particularly impact resistance.

The term "polyphenylene ether-based resin" as used herein is intended to mean a polymer having in its main chain a structural unit represented by the following general formula (III):

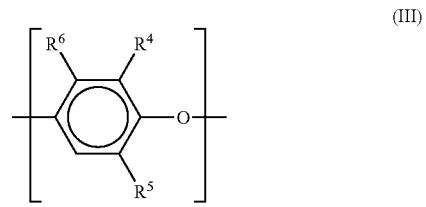

In the general formula (III), $R^4$ represents a $C_1$ to $C_3$ lower alkyl group, and $R^5$ and $R^6$ each represent a hydrogen atom or a $C_1$ to $C_3$ lower alkyl group.

Specific examples of the polyphenylene ether-based resin include poly(2,6-dimethyl-1,4-phenylene)ether, poly(2,6-diethyl-1,4-phenylene)ether, poly(2,6-dipropyl-1,4-phenylene)ether, poly(2-methyl-6-ethyl-1,4-phenylene)ether and poly(2-methyl-6-propyl-1,4-phenylene)ether. Poly(2,6-dimethyl-1,4-phenylene)ether is particularly preferred. The preferred polyphenylene ether-based resin has an intrinsic viscosity, as measured at a temperature of 30° C. in chloroform, of generally 0.2 to 0.6 dl/g, preferably 0.3 to 0.5 dl/g. When the intrinsic viscosity is at least 0.2 dl/g, the impact resistance is improved. When the intrinsic viscosity is not greater than 0.6 dl/g, good moldability and appearance may be obtained. Adjustment of the intrinsic viscosity to the above range may be performed by using two or more polyphenylene ether-based resins having different intrinsic viscosities in combination.

The compounding amount of the polyphenylene ether-based resin (B) is 0.1 to 30 parts by weight, preferably 0.1 to 25 parts by weight, per 100 parts by weight of the aliphatic polyamide resin (A). When the compounding amount is at least 0.1 part by weight, mold deposits and bleeding-out can be sufficiently suppressed while improving the mechanical characteristics. A compounding amount of not greater than 30 parts by weight can suppress the deterioration of the tracking resistance and can improve the productivity.

In the present invention, the polyphenylene ether-based resin may be modified with an unsaturated carboxylic acid, an unsaturated carboxylic anhydride or a derivative thereof (these may be occasionally generically referred to as "modifier"). As a consequence of the modification, the compatibility between the polyamide resin and the polyphenylene ether-based resin may be improved.

As the unsaturated carboxylic acid, unsaturated carboxylic anhydride and derivative thereof, there may be mentioned maleic acid (anhydride), itaconic acid (anhydride), chloromaleic acid (anhydride), citraconic acid (anhydride), butenyl succinic acid (anhydride), tetrahydrophthalic acid (anhydride), and acid halides, amides, imides and $C_1$ to $C_{20}$ alkyl or glycol esters thereof (such as maleimide, monomethyl maleate and dimethyl maleate). As used herein, "(anhydride)" is intended to mean that the compound may be an unsaturated carboxylic anhydride or an unsaturated carboxylic acid.

Among the unsaturated carboxylic acid, unsaturated carboxylic anhydride and derivative thereof, an unsaturated dicarboxylic acid or an anhydride thereof may be preferably used. Particularly suitably used is maleic acid (anhydride) or itaconic acid (anhydride).

The modifier may be compounded together with a radical generating agent. As the radical generating agent, there may be mentioned, for example, an organic peroxide and an azo compound.

Specific examples of the organic peroxide include hydroperoxides such as t-butyl hydroperoxide, cumene hydroperoxide, 2,5-dimethylhexane-2,5-dihydroperoxide, 1,1,3,3-tetramethylbutyl hydroperoxide, p-menthane hydroperoxide and diisopropylbenzene hydroperoxide; dialkylperoxides such as 2,5-dimethyl-2,5-di(t-butylperoxy)hexyne-3, di-t-butylperoxide, t-butylcumylperoxide, 2,5-dimethyl-di(t-butylperoxy)hexane and dicumylperoxide; peroxyketals such as 2,2-bis-t-butylperoxybutane, 2,2-bis-t-butylperoxyoctane, 1,1-bis-t-butylperoxycyclohexane and 1,1-bis-t-butylperoxy-3,3,5-trimethylcyclohexane; peroxyesters such as di-t-butylperoxy isophthalate, t-butylperoxy benzoate, t-butylperoxy acetate, 2,5-dimethyl-2,5-dibenzoylperoxyhexane, t-butylperoxy-isopropyl carbonate and t-butylperoxyisobutylate; and diacylperoxides such as benzoyl peroxide, m-toluoyl peroxide, acetyl peroxide and lauroyl peroxide.

Specific examples of the azo compound include 2,2'-azobisisobutyronitrile, 2,2'-azobis(2-methylbutyronitrile), 1,1'-azobis(cyclohexane-1-carbonitrile), 1-[(1-cyano-1-methylethyl)azo]formamide, 2-phenylazo-4-methoxy-2,4-dimethylvaleronitrile, 2,2'-azobis(2,4,4-trimethylpentane) and 2,2'-azobis(2-methylpropane).

Among the above-described radical generating agents, those which have a 10 hour half life temperature of at least 120° C. are preferred from the viewpoint of dimensional stability and impact resistance. The above-described modifiers and radical generating agents may be used in combination of two or more thereof.

The above-described polyphenylene ether-based resin modified with a modifier may be prepared by weighing and mixing predetermined amounts of the above-described polyphenylene ether-based resin (B) and the modifier (a radical generating agent may be also blended), the resulting mixture being then reacted in a molten state. The compounding amount of the modifier is generally 0.1 to 5 parts by weight, preferably 0.2 to 4 parts by weight, per 100 parts by weight of the polyphenylene ether-based resin (B). The compounding amount of the radical generating agent is generally 0.1 to 2 parts by weight per 100 parts by weight of the polyphenylene ether-based resin (B).

A melt kneader which is generally practically employed for thermoplastic resins may be used for mixing and reacting the above components in a molten state. Such a melt kneader may be, for example, a single- or multi-screw extruder, a roll mixer or a Banbury mixer. When an extruder is used, a method in which the respective components are previously mixed using, for example, a blender is suitably adopted. The resulting mixture is fed at a time to an upstream side of the extruder and reacted in a molten state.

It is not necessary that the polyphenylene ether-based resin should be modified before it is kneaded with the polyamide resin. If desired, the modifier may be added at the time of preparing the polyamide resin composition by kneading. From the viewpoint of compatibility between the polyamide resin and the polyphenylene ether-based resin, however, it is preferred in the present invention that the polyphenylene ether-based resin be previously modified before it is kneaded with the polyamide resin.

The polyphenylene ether-based resin (B) used in the present invention can contain other resin or resins. Preferably, the polyphenylene ether-based resin (B) may contain a styrene-based resin in an amount so that styrene units account for at least 10 mol % of all the components constituting the polyphenylene ether-based resin (B). As the styrene-based resin, there may be mentioned, for example, known resins such as a polystyrene resin, a high impact polystyrene resin, an acrylonitrile-styrene resin, an acrylonitrile-butadiene-styrene resin, methyl acrylate-butadiene-styrene resin, a styrene-ethylene-butadiene-styrene resin and a styrene-ethylene-propylene-styrene resin. These resins may be used in combination of two or more thereof. These styrene-based resins, which have good compatibility with the polyphenylene ether-based resin, are useful for improving the fluidity thereof.

These styrene-based resins may be modified with an unsaturated carboxylic acid, an unsaturated carboxylic anhydride or a derivative thereof in a manner as described previously. The modified styrene-based resins can effectively function as a compatiblizing agent for the polyamide resin and the polyphenylene ether-based resin. Such a modified styrene-based resin having a function as a compatiblizing agent may be previously compounded in the polyphenylene ether-based resin or may be compounded simultaneously at the time the polyphenylene ether-based resin is kneaded with the polyamide resin. The styrene-based resin may compounded after it has been modified. Alternatively, at the time the resin composition is prepared by kneading, the modifier may be compounded therein for modifying the styrene-based resin. For the purpose of obtaining the better effect of the styrene-based resin as a compatiblizing agent, it is preferable to adopt a method in which the polyphenylene ether-based resin, the styrene-based resin, the modifier and, if desired, the radical generating agent are first melt-kneaded, the resulting melt-kneaded mass being subsequently compounded with the polyamide resin and the flame retardant agent to obtain the resin composition of the present invention.

A content of the styrene-based resin in the polyphenylene ether-based resin (B) is generally 1 to 80% by weight, preferably 3 to 60% by weight, more preferably 3 to 50% by weight. When the content is 80% by weight or less, sufficient flame retardancy can be ensured while sufficiently suppressing bleeding-out of the flame retardant.

The above-described "styrene-based resin" used in the present invention is intended to comprise a styrene copolymer elastomer. Among such elastomers, a styrene-ethylene-butadiene-styrene resin (hereinafter occasionally referred to as SEBS for brevity) is useful because it can also improve impact resistance. SEBS is a block copolymer elastomer comprising a styrene compound polymer block (a) and a conjugated diene compound polymer block (b) and is a typical resin of a hydrogenated block copolymer in which the aliphatic unsaturated groups of the block (b) have been decreased by hydrogenation.

The block (a) and block (b) may be arranged to have a linear structure or a branched structure (radical tereblock). These structures may partly contain a random chain derived from a random copolymer moiety of the styrene compound and the conjugated diene compound. Among these structures, the linear structure is preferred and a triblock structure of a (a)-(b)-(a) type is particularly preferred. Also, a diblock structure of a (a)-(b) type may be suitable.

Illustrative of preferred styrene compound are styrene, α-methylstyrene, t-butylstyrene, 1,1-diphenyl styrene and vinylstyrene, with styrene being particularly preferred. Illustrative of the preferred conjugated diene compounds are 1,3-butadiene and 2-methyl-1,3-butadiene.

A proportion of the repeating units derived from the styrene compound in the hydrogenated block copolymer is usually 10 to 70% by weight, preferably 10 to 40% by weight. In the aliphatic chain moiety of the block copolymer, a proportion of the unsaturated bonds which are derived from the conjugated diene compound and which remain unhydrogenated is usually 20% by weight or less, preferably 10% by weight or less. The aromatic unsaturated bonds derived from the styrene compound may be hydrogenated in an amount of about 25% by weight or less.

The number average molecular weight of the hydrogenated block copolymer is usually 20,000 to 180,000, preferably 30,000 to 160,000, more preferably 35,000 to 140,000. When the number average molecular weight is 20,000 or more, the resin composition obtained finally has excellent impact resistance and dimensional stability and is capable of affording a molded article having good appearance. When the number average molecular weight is 180,000 or less, the resin composition obtained finally has improved fluidity and permits a molding process to be easily performed.

Flame Retardant Agent (C):

One of the components contained in the flame retardant agent is a reaction product of a melamine and a phosphoric acid (component (a)). Such a reaction product is intended to mean a substantially equimolar reaction product of a melamine or a melamine condensate with phosphoric acid, pyrophosphoric acid or polyphosphoric acid. A method for producing the reaction product is not specifically limited. As the reaction product, there may be mentioned a melamine polyphosphate (chemical formula: $(C_3H_6N_6 \cdot HPO_3)_n$ where n represents a degree of condensation) obtained, in general, by heating and condensation of a melamine phosphate in a nitrogen atmosphere.

As the phosphoric acid which constitutes the melamine phosphate, there may be specifically mentioned orthophosphoric acid, phosphorous acid, hypophosphoric acid, metaphosphoric acid, pyrophosphoric acid, triphosphoric acid and tetraphosphoric acid. A melamine polyphosphate obtained by condensation of an adduct of melamine with orthophosphoric acid or pyrophosphoric acid is particularly effective as a flame retardant. From the viewpoint of heat resistance, the degree of condensation n of the melamine polyphosphate is preferably 5 or more.

The melamine polyphosphate may be an equimolar addition salt of a polyphosphoric acid with a melamine. In this case, all the polyphosphoric acid and melamine may be in the form of an addition salt. The polyphosphoric acid and melamine may be in the form of a mixture. Thus, as the polyphosphoric acid which forms an addition salt with melamine, it is possible to use a linear polyphosphoric acid or a cyclic polymetaphosphoric acid, which are generally called condensed phosphoric acids. The degree of condensation of these polyphosphoric acids is usually 3 to 50. However, from the viewpoint of heat resistance of the obtained melamine polyphosphate, the degree of condensation n of the polyphosphoric acid is preferably 5 or more.

The polyphosphoric acid-melamine addition salt may be a powder obtained by, for example, a method which includes forming a mixture of a melamine and a polyphosphoric acid into an aqueous slurry, thoroughly mixing the slurry to form fine particles of a reaction product of them, filtering the slurry, and washing, drying, if desired calcining, and then pulverizing the obtained solids.

The melamine polyphosphate may also be an addition salt of a phosphoric acid with a melamine condensate. In this case, all the phosphoric acid and melamine condensate may be in the form of an addition salt. The phosphoric acid and melamine condensate may be in the form of a mixture. As the melamine condensate which forms an addition salt with a phosphoric acid may be, for example, melem, melam or melon.

In the present invention, the melamine polyphosphate usually has a number average particle diameter of 100 μm or less, preferably 50 μm or less, more preferably 0.5 to 20 μm from the viewpoint of mechanical strength and appearance of molded articles. The use of such a powder can not only give high flame retardancy but also significantly improve strength of molded articles. It is not necessary that the melamine polyphosphate should be perfectly pure. Rather, a small amount of the unreacted melamine, melamine condensate, phosphoric acid or polyphosphate may be present therein. A proportion of phosphorus atoms in the melamine polyphosphate is preferably 8 to 18% by weight for reasons of preventing occurrence of deposition of staining substances on molds at the time of a molding process.

The compounding amount of the component (a) is usually 1 to 60 parts by weight, preferably 5 to 50 parts by weight, more preferably 8 to 40 parts by weight, per 100 parts by weight of the aliphatic polyamide resin (A). When the compounding amount of the component (a) is at least 1 part by weight, the flame retardancy can be sufficiently improved. When the compounding amount of the component (a) is not greater than 60 parts by weight, the generation of gases can be reduced so that occurrence of troubles during the extrusion and molding processes can be avoided.

Another one of the components contained in the flame retardant agent (C) is a phosphinic acid salt represented by the general formula (I) shown below and/or a diphosphinic acid salt represented by the general formula (II) shown below (component (b)). These two salts may be hereinafter occasionally referred to as (di)phosphonic acid salt.

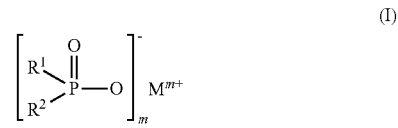

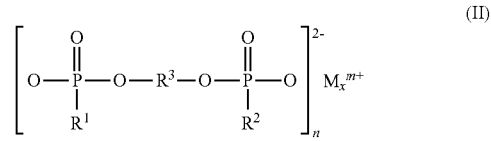

In the above general formulae (I) and (II), $R^1$ and $R^2$ are the same or different and each represent linear or branched $C_1$ to $C_6$ alkyl and/or $C_6$ to $C_{10}$ aryl, $R^3$ represents linear or branched $C_1$ to $C_{10}$ alkylene, $C_7$ to $C_{10}$ arylene, $C_7$ to $C_{10}$ alkylarylene or $C_7$ to $C_{10}$ arylalkylene, M is Ca, Mg, Al or Zn, m is a valence of M, n is 1 or 3 and x is 1 or 2, with the proviso that 2n=mx.

As the groups $R^1$ and $R^2$, there may be mentioned, for example, a methyl group, an ethyl group, an n-propyl group, an i-propyl group, an n-butyl group, a tert-butyl group, an n-pentyl group and a phenyl group. As $R^3$, there may be mentioned, for example, a methylene group, an ethylene group, an n-propylene group, an i-propylene group, an n-butylene group, a tert-butylene group, an n-pentylene group, an n-octylene group, an n-dodecylene group, a phenylene group and a naphthylene group. The symbol M is preferably Ca, Al or Zn.

The (di)phosphinic acid salt may be prepared by, for example, in an aqueous medium, using a metal carbonate, a metal hydroxide or a metal oxide of phosphinic acid. The (di)phosphinic acid salt is essentially a monomeric compound but can possibly be a polymeric phosphinic acid salt with a degree of condensation of 1 to 3, according to the reaction conditions and the environment in which it is present.

Examples of the phosphinic acid include dimethylphosphinic acid, ethylmethylphosphinic acid, diethylphosphinic acid, methyl-n-propylphosphinic acid, methanedi(methylphosphinic acid), benzene-1,4-di(methylphosphinic acid), methylphenylphosphinic acid and diphenylphosphinic acid. Examples of the metal component to be reacted with the above phosphinic acid include metal carbonates, metal hydroxides and metal oxides containing calcium ions, magnesium ions, aluminum ions and/or zinc ions.

As the phosphinic acid salt, there may be mentioned, for example, calcium dimethylphosphinate, magnesium dimethylphosphinate, aluminum dimethylphosphinate, zinc dimethylphosphinate, calcium ethylmethylphosphinate, magnesium ethylmethylphosphinate, aluminum ethylmethylphosphinate, zinc ethylmethylphosphinate, calcium diethylphosphinate, magnesium diethylphosphinate, aluminum diethylphosphinate, zinc diethylphosphinate, calcium methyl-n-propylphosphinate, magnesium methyl-n-propylphosphinate, aluminum methyl-n-propylphosphinate, zinc methyl-n-propylphosphinate, calcium methylphenylphosphinate, magnesium methylphenylphosphinate, aluminum methylphenylphosphinate, zinc methylphenylphosphinate, calcium diphenylphosphinate, magnesium diphenylphosphinate, aluminum diphenylphosphinate and zinc diphenylphosphinate.

As the diphosphinic acid salt, there may be mentioned, for example, calcium methanedi(methylphosphinate), magnesium methanedi(methylphosphinate), aluminum methanedi-(methylphosphinate), zinc methanedi(methylphosphinate), calcium benzene-1,4-di(methylphosphinate), magnesium benzene-1,4-di(methylphosphinate), aluminum benzene-1,4-di(methylphosphinate) and zinc benzene-1,4-di(methylphosphinate).

Among the above-described (di)phosphinic acid salts, aluminum ethylmethylphosphinate, aluminum diethylphosphinate and zinc diethylphosphinate are particularly preferred from the viewpoint of flame retardancy and electrical characteristics.

In the present invention, the (di)phosphinic acid salt generally has a number average particle diameter of 100 µm or less, preferably 80 µm or less, from the viewpoint of mechanical strength and appearance of molded articles. In particular, the use of a powder of 0.5 to 50 µm can not only give high flame retardancy but also significantly improve strength of molded articles. A proportion of phosphorus atoms in the (di)phosphinic acid salt is preferably 5 to 40% by weight for reasons of preventing occurrence of deposition of staining substances on molds at the time of a molding process. The (di)phosphinic acid salt functions as a flame retardant. Moreover, it can exhibit both excellent flame retardancy and excellent electrical characteristics when used in combination with the adduct (a) formed by a melamine and a phosphoric acid.

The compounding amount of the component (b) is usually 2 to 70 parts by weight, preferably 8 to 60 parts by weight, more preferably 12 to 50 parts by weight, per 100 parts by weight of the aliphatic polyamide resin (A). When the compounding amount of the component (b) is at least 2 parts by weight, the flame retardancy can be sufficiently improved. When the compounding amount of the component (b) is not greater than 70 parts by weight, occurrence of troubles during the extrusion and molding processes can be avoided.

A further one of the components contained in the flame retardant agent (C) is a metal salt of boric acid (component (c)). A metal salt of boric acid which is stable under ordinary treatment conditions and is free of volatile components is preferably used. As the metal salt of boric acid, there may be mentioned, for example, alkali metal salts of boric acid (sodium tetraborate, potassium metaborate, etc.) and alkaline earth alkali metal salts of boric acid (calcium borate, magnesium orthoborate, barium orthoborate, zinc borate, etc.). Among these metal salts, $2ZnO.3B_2O_3$ and hydrated zinc borate of $2ZnO.3B_2O_3.xH_2O$ (x=3.3 to 3.7) or $4ZnO.B_2.H_2O$ have excellent thermally stability and are stable at a temperature of up to 260° C. or higher.

In the present invention, the metal salt of boric acid usually has a number average particle diameter of 30 µm or less, preferably 1 to 20 µm, from the viewpoint of mechanical strength and appearance of molded articles. By using such a powder, mechanical impact strength of molded articles is particularly stabilized.

The compounding amount of the component (c) is usually 0.1 to 30 parts by weight, preferably 0.5 to 25 parts by weight, more preferably 1 to 20 parts by weight, per 100 parts by weight of the aliphatic polyamide resin (A). When the compounding amount of the component (c) is at least 0.1 part by weight, the flame retardancy and tracking resistance can be sufficiently improved. When the compounding amount of the component (c) is not greater than 30 parts by weight, impact strength can be maintained good.

In the present invention, a compounding weight ratio (a):(b):(c) of the above-described components of the flame retardant agent (C) must be 1:(0.5 to 2.5):(0.01 to 1), preferably 1:(0.6 to 2.4):(0.05 to 1).

A compounding weight ratio of the component (b) less than the above range is insufficient to obtain the effect of improving the flame retardancy. When the ratio of the component (b) is greater than the above range, gas generation tends to be significant. A compounding weight ratio of the component (c) less than the above range is insufficient to obtain the effect of improving the flame retardancy and tracking resistance. When the ratio of the component (c) is greater than the above range, the flame retardancy is unsatisfactory, gases are generated significantly and the glow wire property and impact strength tend to be deteriorated.

A total weight of the components (a), (b) and (c) of the flame retardant agent (C) is usually at least 50% by weight, preferably at least 60% by weight, more preferably at least 70% by weight. When the total weight of the components falls within the above range, the effect of improving the flame retardancy is great.

In addition to the components (a), (b) and (c), the flame retardant agent (C) can contain other flame retardant or retardants such as those of a triazine type (e.g. melamine cyanurate), a phosphate type, a metal hydrate type and a silicone type. Above all, a triazine type flame retardant, particularly a melamine cyanurate (component (d)) is preferred.

The melamine cyanurate is an equimolar reaction product of cyanuric acid and a melamine. The melamine cyanurate may have some of the amino groups or hydroxyl groups thereof substituted with other substituents. The melamine cyanurate may be obtained, for example, by a method comprising mixing an aqueous cyanuric acid solution and an aqueous melamine solution, reacting the resulting mixture with stirring at a temperature of 90 to 100° C., and filtering precipitates thus formed. The reaction product is a white solid. It is preferable to pulverize the product into a fine powder. A commercial available product may also be suitably used for the purpose of the present invention as such or after pulverization.

Since the melamine cyanurate starts decomposing at a temperature above 260° C., it is preferred that the molding be carried out at a temperature not higher than 260° C. in order to prevent occurrence of molding failure and to ensure flame retardancy. At a low temperature of 260° C. or below, the fluidity tends to decrease especially when an inorganic filler is compounded. Therefore, when the melamine cyanurate is compounded in the resin composition of the present invention, it is preferable to use a polyamide resin which has a melting point as low as possible below 260° C. and which ensures flame retardancy, specifically a polyamide resin containing polyamide 6 as a major component.

A compounding amount of melamine cyanurate (component (d)) is usually 0.2 to 40 parts by weight, preferably 1 to 30 parts by weight, more preferably 3 to 25 parts by weight, per 100 parts by weight of the aliphatic polyamide resin (A). When the compounding amount of the component (d) is at least 0.2 part by weight, satisfactory flame retardancy can be sufficiently achieved. When the compounding amount of the component (d) is not greater than 40 parts by weight, an extrusion process can be easily carried out and decomposition of the resin components during the molding process can be suppressed.

In the present invention, a compounding weight ratio (a):(b):(c):(d) of the above-described components of the flame retardant agent (C) is 1:(0.5 to 2.5):(0.01 to 1):(0.02 to 2), preferably 1:(0.6 to 2.4):(0.05 to 1):(0.02 to 1.8).

A compounding weight ratio of the component (b) less than the above range is insufficient to obtain the effect of improving the flame retardancy. When the ratio of the component (b) is greater than the above range, gas generation tends to be significant. A compounding weight ratio of the component (c) less than the above range is insufficient to obtain the effect of improving the flame retardancy and tracking resistance. When the ratio of the component (c) is greater than the above range, the flame retardancy is unsatisfactory, gases are generated significantly and the glow wire property and impact strength tend to be deteriorated. A compounding weight ratio of the component (d) less than the above range is insufficient to obtain the effect of improving the flame retardancy, especially when wollastonite is used as an inorganic filler and is compounded in a large amount, to be more specific, when wollastonite is compounded in an amount of 40 parts by weight per 100 parts by weight of the aliphatic polyamide resin (A). When the amount of the component (d) is greater than the above specified range, mold deposits are apt to be formed.

A total weight of the components (a), (b) and (c) of the flame retardant agent (C) is usually at least 60% by weight, preferably at least 65% by weight, more preferably at least 70% by weight. When the total weight of the components falls within the above range, the effect of improving the flame retardancy is great.

A compounding amount of the flame retardant agent (C) is 5 to 100 parts by weight, preferably 7 to 90 parts by weight, more preferably 10 to 80 parts by weight, per 100 parts by weight of the aliphatic polyamide resin (A). When the compounding amount of the flame retardant agent (C) is at least 5 parts by weight, the flame retardancy and glow wire property can be sufficiently improved. When the compounding amount of the flame retardant agent (C) is not greater than 100 parts by weight, good mechanical strength can be achieved and, also, the generation of gases and mold deposits can be reduced so that the molding process can be easily carried out.

Inorganic Filler (D):

The inorganic filler used in the present invention may be, for example, glass-type fillers (glass fibers, ground glass fibers (milled fibers), glass flakes, glass beads, etc.), calcium silicate-type fillers (wollastonite, etc.), mica, talc, kaolin, potassium titanate whiskers and carbon fibers. These fillers may be properly selectively used according to the required characteristics of molded articles. For example, glass-type fillers may be suitably used from the viewpoint of mechanical characteristics, flame retardancy and economy. In this case, glass-type fillers of E glass are more preferred for further reasons of the low alkali content and good electrical characteristics. From the viewpoint of tracking characteristics and appearance of molded articles, calcium silicate-type fillers are preferred.

A typical known calcium silicate-type filler is wollastonite which is a mineral of white needle-like crystals and usually comprises 40 to 60% by weight of $SiO_2$, to 55% by weight of CaO and other components such as $Fe_2O_3$, $Al_2O_3$, MgO, $Na_2O$ and $K_2O$. The wollastonite may be one which is obtained by pulverizing naturally occurring wollastonite, followed by, if desired, classification. Alternatively, the wollastonite may be a synthetic product. It is preferred that the wollastonite have a Hunter whiteness of at least 60 and, in order not to adversely affect the weather resistance of the polyamide, a pH of 6 to 8 when formed into a 10% by weight slurry in high purity water.

A mean size (l) of the inorganic filler (D) is not specifically limited but is usually 10 to 300 μm. A mean size (l) of at least 10 μm can sufficiently achieve the effect of improving mechanical strength and heat resistance. A mean size (l) of not greater than 300 μm can achieve excellent flame retardancy and glow wire characteristics. In order to satisfy flame retardancy and tracking resistance which are required in application for breakers, an inorganic filler of 10 to 100 μm is more preferred, especially an inorganic filler of 15 to 65 μm is still more preferred.

As used herein the term "mean size (l)" of a filler is intended to refer to a number average of the maximum dimension thereof. When fillers with different shapes are used in combination, the mean size (l) is an average of the multiplied values of number average sizes of the different shapes and proportions of the different shapes.

The term "maximum dimension" as used herein is intended to mean as follows. In the case of fibrous fillers such as glass fibers, ground glass fibers and wollastonite, the maximum dimension is the maximum length in the direction of the fiber. In the case of plate-like fillers such as glass flakes and mica, the maximum dimension is the maximum diameter of the plate. In the case of spherical fillers such as glass beads, the maximum dimension is the maximum diameter of the sphere. The term "minimum dimension" is intended to mean a diameter in the direction normal to the fiber length in the case of fibrous fillers, a thickness of the plate in the case of plate-like fillers, and the minimum diameter of the sphere in the case of spherical fillers. A number average of the minimum dimensions is herein called mean diameter (d).

The inorganic filler has an aspect ratio (l/d) of usually 1.5 to 8, preferably 2 to 7. When the aspect ratio is at least 1.5, the mechanical strength can be improved. An aspect ratio of not greater than 8 can give a resin composition which is excellent in flame retardancy, tracking resistance and glow wire property.

The mean size (l) and mean diameter (d) of the inorganic filler are measured for residual particles obtained by heating and ashing pellets of the resin composition in an electric furnace at 500° C. for 30 to 60 minutes. After the ashing, an adequate amount of the obtained filler particles is added into a 3% by weight aqueous neutral detergent solution. The mixture is stirred to obtain a dispersion of the filler particles. The dispersion is sampled and placed on a glass plate using a pipette and photographed with a stereo microscope. The photo image is analyzed with a digitizer to measure the maximum dimension and the minimum dimension of each of 1,000 different particles. The measured values are averaged in a manner as described above.

It is preferred that the inorganic filler be treated with a surface treating agent or a sizing agent from the viewpoint of mechanical strength. The inorganic filler may be previously surface-treated. Alternatively, a surface treating agent or a sizing agent may be added during the preparation of the resin composition of the present invention so that a non-treated inorganic filler is surface treated in situ.

Examples of the surface treating agent include aminosilane compounds such as γ-aminopropyltriethoxysilane, γ-aminopropyltrimethoxysilane and γ-(2-aminoethyl)-aminopropyltrimethoxysilane; chlorosilane compounds such as vinyltrichlorosilane and methylvinyldichlorosilane; alkoxysilane compounds such as vinyltrimethoxysilane, vinyltriethoxysilane, vinyltriacetoxysilane and γ-methacryloxypropyltrimethoxysilane; epoxysilane compounds such as β-(3,4-epoxycyclohexyl)ethyltrimethoxysilane and γ-glycidoxypropyltrimethoxysilane; acrylic compounds; isocyanate compounds; titanate compounds; and epoxy compounds.

As the sizing agent, there may be mentioned, for example, a resin emulsion of a vinyl acetate resin, an ethylene-vinyl acetate copolymer, an acrylic resin, an epoxy resin, a polyurethane resin and a polyester resin.

If desired, two or more surface treating agents and sizing agents may be used in combination. The amount of each of the surface treating agent and sizing agent is usually 10% by weight or less, preferably 0.05 to 5% by weight, based on the weight of the inorganic filler. A deposition amount of 10% by weight or less can give a necessary and sufficient effect and is economical.

It is preferred that the above-described glass fibers be treated with the sizing agent. The treatment of the glass fibers with the sizing agent can improve the workability in handling of the glass fibers and can prevent damages of the glass fibers.

A compounding amount of the inorganic filler (D) is 5 to 150 parts by weight, preferably 5 to 145 parts by weight, more preferably 5 to 140 parts by weight, per 100 parts by weight of the aliphatic polyamide resin (A). When the compounding amount of the inorganic filler (D) is at least 5 parts by weight, the mechanical characteristics can be sufficiently improved while preventing a reduction of rigidity due to water absorption. When the compounding amount of the inorganic filler (D) is not greater than 150 parts by weight, surface appearance of molded articles can be maintained good. Two or more inorganic fillers may be used in combination according to the required characteristics.

The resin composition of the present invention is particularly excellent in mechanical characteristics and in electrical characteristics and, therefore, is suitably used as breakers and electrical equipments. In such applications, the composition is often required to have particularly excellent impact resistance. An elastic polymer described below is used for the purpose of improving the impact resistance.

Elastic Polymer (E):

As a typical elastic polymer, there may be mentioned an ethylene-α-olefin-based copolymer and a hydrogenation product of a block copolymer containing a styrene compound polymer block (a) and a conjugated diene compound polymer block (b). The elastic polymer has a glass transition temperature of usually $-20°$ C. or below, preferably $-30°$ C. or below. When the glass transition temperature of the elastic polymer is $-20°$ C. or below, good impact strength at low temperatures is obtained.

The ethylene-α-olefin-based copolymer is a rubber-like copolymer containing, as essential components, ethylene and an α-olefin. The ethylene-α-olefin-based copolymer has a weight ratio of ethylene to α-olefin of generally 90:10 to 20:80, preferably 75:25 to 40:60. As the α-olefin used for the copolymer, there may be mentioned $C_3$ to $C_{20}$ unsaturated hydrocarbon compounds such as propylene, 1-butene, 1-hexene, 1-octene, 1-decene, 3-methylbutene-1 and 4-methylpentene-1. Generally used is a linear $C_3$ to $C_{10}$ α-olefin. Particularly preferred are propylene, 1-butene and 1-octene.

The ethylene-α-olefin-based copolymer may be a copolymer comprising a diene compound in addition to ethylene and the α-olefin. As the diene compound, there may be mentioned alkenylnorbornenes, cyclic dienes and aliphatic dienes. Particularly preferred are 5-ethylidene-2-norbornene and dicyclopentadiene.

The ethylene-α-olefin-based copolymer has a melt flow rate (MFR) (ASTM-D1238, temperature: 190° C., load: 2.16 kg) of usually 0.05 to 200 g/10 minutes, preferably 0.1 to 100 g/10 minutes, more preferably 0.1 to 50 g/10 minutes. When the MFR value is at least 0.05 g/10 minutes, a molding process can be easily carried out. When the MFR value is not greater than 200 g/10 minutes, good impact resistance can be obtained.

In the present invention, a block copolymer comprising a styrene compound polymer block (a) and a conjugated diene compound polymer block (b) or a hydrogenation product of the block copolymer may be also be preferably used. Such a styrene-based elastic polymer may be used, as described previously, for the modification of the polyphenylene ether-based resin (B). In addition to such a use, the styrene-based elastic polymer may be used as the component (E) of the resin composition of the present invention. As the styrene compound and conjugated diene compound used for the block copolymer or hydrogenation product thereof, there may be preferably used those which have been described in connection with the aforementioned "styrene-based resin".

As the hydrogenation product of the block copolymer, various kinds of products having a (a)-(b)-(a) type triblock structure, such as SEBS in which the conjugated diene compound (being a monomer constituting the conjugated diene compound polymer block (b)) is 1,3-butadiene and SEPS in which the conjugated diene compound is 2-methyl-1,3-butadiene, are on the market and easily available.

The block copolymer or hydrogenation product thereof has a number average molecular weight of usually 20,000 to 180,000, preferably 30,000 to 160,000, more preferably 35,000 to 140,000. When the number average molecular weight is at least 20,000, the resin composition finally obtained has excellent impact resistance and dimensional stability and, further, can give molded articles having good appearance. When the number average molecular weight is not greater than 180,000, the resin composition finally obtained has excellent fluidity and is easily molded.

In the present invention, an elastic polymer modified with a modifier such as an unsaturated carboxylic acid, an unsaturated carboxylic anhydride or a derivative thereof may be suitably used. The compounding amount of the modifier is usually 0.05 to 5 parts by weight, preferably 0.2 to 4 parts by weight, per 100 parts by weight of the elastic polymer. When the compounding amount is at least 0.05 part by weight, deterioration of the impact resistance can be suppressed.

When the compounding amount is not greater than 5 parts by weight, good thermal stability, fluidity and dimensional stability may be obtained. A radical generating agent may be compounded together with the modifier. The radical generating agent may be generally compounded in an amount of 0.1 to 2 parts by weight per 100 parts by weight of the elastic polymer. As the modifier and radical generating agent, there may be suitably used, for example, compounds which are similar to those used for the modification of the aforementioned polyphenylene ether-based resin.

A compounding amount of the elastic polymer (E) is usually 1 to 40 parts by weight, preferably 3 to 35 parts by weight, more preferably 3 to 30 parts by weight, per 100 parts by weight of the aliphatic polyamide resin (A). When the compounding amount is at least 1 part by weight, the impact resistance can be improved and the productivity in injection molding can be enhanced. When the compounding amount is not greater than 40 parts by weight, deterioration of flame retardancy, tracking resistance and glow wire property can be suppressed. Two or more elastic polymers may be used in combination.

Mold Releasing Agent (F)

In the present invention, a mold releasing agent may be used mainly for the purpose of improving the productivity in molding of the resin composition. An aliphatic type mold releasing agent is suitably used. As the aliphatic type mold releasing agent, there may be mentioned, for example, those of a metal aliphatic carboxylate type, an amide type, an aliphatic carboxylic acid type, an aliphatic carboxylic acid ester type and an aliphatic hydrocarbon type. Above all, a metal salt of a long-chain aliphatic carboxylic acid and a carboxylic acid amide-based wax are particularly preferred. Two or more mold releasing agents may be used in combination.

The metal salt of a long-chain aliphatic carboxylic acid is a metal salt of $C_{16}$ to $C_{36}$ aliphatic carboxylic acid. Specific examples of the metal salts include, calcium stearate, calcium montanate, sodium montanate, zinc stearate, aluminum stearate, sodium stearate and lithium stearate.

As the carboxylic acid amide-based wax, there may be mentioned, for example, a compound obtained by dehydration reaction of a higher aliphatic monocarboxylic acid and/or a polybasic acid with a diamine.

As the higher aliphatic monocarboxylic acid, a $C_{16}$ or higher saturated aliphatic monocarboxylic acid or a hydroxycarboxylic acid is preferred. Specific examples of the carboxylic acid include palmitic acid, stearic acid, behenic acid, montanic acid and 12-hydroxystearic acid.

As the polybasic acid, there may be mentioned, for example, aliphatic dicarboxylic acids such as malonic acid, succinic acid, adipic acid, sebacic acid, pimelic acid and azelaic acid; aromatic dicarboxylic acids such as phthalic acid and terephthalic acid; and alicyclic dicarboxylic acids such as cyclohexanedicarboxylic acid and cyclohexylsuccinic acid.

As the diamine, there may be mentioned, for example, ethylenediamine, 1,3-diaminopropane, 1,4-diaminobutane, hexamethylenediamine, metaxylylenediamine, tolylenediamine, paraxylylenediamine, phenylenediamine and isophoronediamine.

The softening point of the carboxylic acid amide-based wax may be desirably controlled by changing the mixing proportion of the polybasic acid relative to the higher aliphatic monocarboxylic acid which are used for the production of the wax. The polybasic acid is generally mixed in an amount of 0.18 to 1.0 mole per 2 moles of the higher aliphatic monocarboxylic acid. A mixing proportion of the diamine varies with the amount of the polybasic acid used and is usually 1.5 to 2.0 moles per 2 moles of the higher aliphatic monocarboxylic acid.

As the carboxylic acid amide-based wax, a compound obtained by the polycondensation of stearic acid, sebacic acid and ethylene diamine is preferred. More preferred is a compound obtained by the polycondensation of 2 moles of stearic acid, 1 mole of sebacic acid and 2 moles of ethylene diamine. Further, a bisamide type wax, such as N,N'-methylenebissteamide or N,N'-ethylenebissteamide, obtainable by reacting a diamine with an aliphatic carboxylic acid, and a dicarboxylic acid amide such as N,N'-dioctadecylterephthalamide may also be suitably used.

A compounding amount of the mold releasing agent (F) is usually 0.001 to 3 parts by weight, preferably 0.005 to 2 parts by weight, per 100 parts by weight of the aliphatic polyamide resin (A). When the compounding amount is within the above-described range, productivity in injection molding and dispersibility of the mold releasing agent can be improved while suppressing deterioration of the flame retardancy, tracking resistance and glow wire property.

In the present invention, other resin additives than the above-described components such as a stabilizer, an antioxidant, a pigment, a dye, a nucleating agent, an antistatic agent, a UV absorbing agent and the like known additive may be used as long as the objectives of the present invention are not adversely affected. Such additives may be used in combination of two or more thereof.

Illustrative of suitable stabilizers are organic stabilizers such as those of a phosphorus type, a hindered phenol type, a hindered amine type and an oxanilide type; and inorganic stabilizers such as copper compounds and halides. As the phosphorus type stabilizers, phosphite compounds and phosphonite compounds are preferred.

Examples of the phosphite compounds include distearylpentaerythritol diphosphite, dinonylphenyl-pentaerythritol diphosphite, bis(2,4-di-t-butylphenyl)-pentaerythritol diphosphite, bis(2,6-di-t-butyl-4-methylphenyl)pentaerythritol diphosphite, bis(2,6-di-t-butyl-4-ethylphenyl)pentaerythritol diphosphite, bis(2,6-di-t-butyl-4-isopropylphenyl)pentaerythritol diphosphite, bis(2,4,6-tri-t-butylphenyl) pentaerythritol diphosphite, bis(2,6-di-t-butyl-4-sec-butylphenyl)pentaerythritol diphosphite, bis(2,6-di-t-butyl-4-t-octylphenyl)-pentaerythritol diphosphite and bis(2,4-di-cumylphenyl)-pentaerythritol diphosphite. Particularly preferred are bis(2,6-di-t-butyl-4-methylphenyl)pentaerythritol diphosphite and bis(2,4-di-cumylphenyl)-pentaerythritol diphosphite.

Examples of the phosphonite compounds include tetrakis (2,4-di-t-butylphenyl)-4,4'-biphenylene diphosphonite, tetrakis(2,5-di-t-butylphenyl)-4,4'-biphenylene diphosphonite, tetrakis(2,3,4-trimethylphenyl)-4,4'-biphenylene diphosphonite, tetrakis(2,3-dimethyl-5-ethylphenyl)-4,4'-biphenylene diphosphonite, tetrakis(2,6-di-t-butyl-5-ethylphenyl)-4,4'-biphenylene diphosphonite, tetrakis(2,3,4-tributylphenyl)-4, 4'-biphenylene diphosphonite and tetrakis(2,4,6-tri-t-butylphenyl)-4,4'-biphenylene diphosphonite. Particularly preferred is tetrakis(2,4-di-t-butylphenyl)-4,4'-biphenylene diphosphonite.

Examples of the hindered phenol type stabilizer include n-octadecyl-3-(3,5-di-t-butyl-4-hydroxyphenyl)propionate, 1,6-hexanediol-bis-[3-(3,5-di-t-butyl-4-hydroxyphenyl)-propionate], pentaerythritoltetrakis[3-(3,5-di-t-butyl-4-hydroxyphenyl)propionate], 3,9-bis[1,1-dimethyl-2-[β-(3-t-butyl-4-hydroxy-5-methylphenyl]propionyloxy)ethyl]-2,4, 8,10-tetraoxaspiro[5,5]undecane, triethylene glycol-bis-[3-(3-t-butyl-5-methyl-4-hydroxyphenyl)propionate], 3,5-di-t- butyl-4-hydroxybenzyl phosphonate-diethyl ester, 1,3,5-trimethyl-2,4,6-tris(3,5-di-t-butyl-4-hydroxybenzyl) benzene, 2,2-thio-diethylenebis[3-(3,5-di-t-butyl-4-hydroxyphenyl)propionate], tris(3,5-di-t-butyl-4-hydroxybenzyl)isocyanurate and N,N'-hexamethylenebis(3,5-di-t-butyl-4-hydroxy-hydrocinamide). Above all, n-octadecyl-3-(3,5-di-t-butyl-4-hydroxyphenyl)propionate, 1,6-hexanediol-bis[3-(3,5-di-t-butyl-4-hydroxyphenyl)propionate], pentaerythritol-tetrakis[3-(3,5-di-t-butyl-4-hydroxyphenyl)propionate], 3,9-bis[1,1-dimethyl-2-[β-(3-t-butyl-4-hydroxy-5-methylphenyl)propionyloxy)ethyl]-2,4,8,10-tetraoxaspiro[5,5]undecane and N,N'-hexamethylenebis(3,5-di-t-butyl-4-hydroxy-hydrocinamide) are preferred.

As the hindered amine type stabilizer, there may be mentioned, for example, known hindered amine compounds having a 2,2,6,6-tetramethylpiperidine skeleton. Specific examples of the hindered amine compound include 4-acetoxy-2,2,6,6-tetramethylpiperidine, 4-stearoyloxy-2,2,6,6-tetramethylpiperidine, 4-acryloyloxy-2,2,6,6-tetramethyl-piperidine, 4-phenylacetoxy-2,2,6,6-tetramethylpiperidine, 4-benzoyloxy-2,2,6,6-tetramethylpiperidine, 4-methoxy-2,2,6,6-tetramethylpiperidine, 4-stearyloxy-2,2,6,6-tetramethylpiperidine, 4-cyclohexyloxy-2,2,6,6-tetramethylpiperidine, 4-benzyloxy-2,2,6,6-tetramethylpiperidine, 4-phenoxy-2,2,6,6-tetramethylpiperidine, 4-ethylcarbamoyloxy-2,2,6,6-tetramethylpiperidine, 4-cyclohexylcarbamoyloxy-2,2,6,6-tetramethylpiperidine, 4-phenylcarbamoyloxy-2,2,6,6-tetramethylpiperidine, bis(2,2,6,6-tetramethyl-4-piperidyl)carbonate, bis(2,2,6,6-tetramethyl-4-piperidyl) oxalate, bis(2,2,6,6-tetramethyl-4-piperidyl)malonate, bis(2,2,6,6-tetramethyl-4-piperidyl)sebacate, bis(2,2,6,6-tetramethyl-4-piperidyl)adipate, bis(2,2,6,6-tetramethyl-4-piperidyl)terephthalate, 1,2-bis(2,2,6,6-tetramethyl-4-piperidyloxy)ethane, α,α'-bis(2,2,6,6-tetramethyl-4-piperidyloxy)-p-xylene, bis(2,2,6,6-tetramethyl-4-piperidyltolylene)-2,4-dicarbamate, bis(2,2,6,6-tetramethyl-4-piperidyl)hexamethylene-1,6-dicarbamate, tris(2,2,6,6-tetramethyl-4-piperidyl)benzene-1,3,5-tricarboxylate, tris(2,2,6,6-tetramethyl-4-piperidyl)benzene-1,3,4-tricarboxylate, 1-[2-{3-(3,5-di-t-butyl-4-hydroxyphenyl) propionyloxy}butyl]-4-[3-(3,5-di-t-butyl-4-hydroxyphenyl) propionyloxy]-2,2,6,6-tetramethylpiperidine, a condensate of 1,2,3,4-butanetetracarboxylic acid, 1,2,2,6,6-tetramethyl-4-piperidinol and β,β,β',β'-tetramethyl-3,9-[2,4,8,10-tetraoxaspiro(5.5)undecane)diethanol, a polycondensation product of dimethyl succinate with 1-(2-hydroxyethyl)-4-hydroxy-2,2,6,6-tetramethylpiperidine and 1,3-benzenedicarboxamide-N,N'-bis(2,2,6,6-tetramethyl-4-piperidyl).

As commercial products of the hindered amine type compounds, there may be mentioned "ADEKASTAB LA-52, LA-57, LA-62, LA-67, LA-63P, LA-68LA, LA-77, LA-82 and LA-87" (produced by Asahi Denka Kogyo K. K.), "TINUVIN 622, 944, 119, 770 and 144" (produced by Ciba Speciality Chemicals), "SUMISORB 577" (produced by Sumitomo Chemical Co., Ltd.), "CYASORB UV-3346, 3529 and 3853", (produced by Cyanamid Inc. and "NYLOSTAB S-EED" (produced by Clariant Japan K. K.).

Examples of the preferred oxanilide type stabilizer include 4,4'-dioctyloxyoxanilide, 2,2'-diethoxyoxanilide, 2,2'-dioctyloxy-5,5'-di-t-butoxanilide, 2,2'-didodecyloxy-5,5'-di-t-butoxanilide, 2-ethoxy-2'-ethyloxanilide, N,N'-bis(3-dimethylaminopropyl)oxanilide, 2-ethoxy-5-t-butyl-2'-ethoxanilide and its mixture with 2-ethoxy-2'-ethyl-5,4'-di-t-butoxanilide, a mixture of o- and p-methoxy-disubstituted oxanilide and a mixture of o- and p-ethoxy-disubstituted oxanilide.

The copper compounds used as the inorganic stabilizer are copper salts (either cuprous or cupric salts) of various inorganic or organic acids. Specific examples of the copper compound include copper chloride, copper bromide, copper iodide, copper phosphate, copper stearate and natural minerals such as hydrotarcite, stichtite and pilolite.

As the halide used as the inorganic stabilizer, there may be mentioned, for example, an alkali metal or alkaline earth metal halide; ammonium halide and an organic quaternary ammonium halide; and an organic halide such as an alkyl halide or an allyl halide. Specific examples of the ammonium halide include ammonium iodide, stearyltriethyl-ammonium bromide and benzyltriethylammonium iodide. Among the halides, alkali metal halides such as potassium chloride, sodium chloride, potassium bromide, potassium iodide and sodium iodide are preferred.

The conjoint use of a copper compound and a halide, in particular the conjoint use of a copper compound and an alkali metal halide, is preferable because excellent resistance to thermal coloration and weather resistance (light resistance) may be obtained. For example, when a copper compound is used by itself, molded articles are occasionally colored red-brown due to copper. Such coloration is sometimes undesirable depending upon the object of use. In such a case, the red-brown coloration can be prevented when the copper compound is used together with a halide.

A compounding amount of the stabilizer is usually 0.001 to 3 parts by weight, preferably 0.001 to 2 parts by weight, per 100 parts by weight of the aliphatic polyamide resin (A). When the compounding amount is at least 0.001 part by weight, the stabilizer can sufficiently exhibit its effect of preventing thermal coloration and effect of improving weather resistance and light resistance. When the compounding amount is not greater than 3 parts by weight, deterioration of mechanical properties can be suppressed.

Further, the resin composition of the present invention may additionally comprise other resin or resins as long as the objectives of the present invention are not adversely affected. A thermoplastic resin which may be compounded in the resin composition may be, for example, an acrylic resin, a polyester resin, a polyphenylene sulfide resin, a liquid crystalline polyester resin or a polyacetal resin. A thermosetting resin which may be compounded in the resin composition may be, for example, a phenol resin, a melamine resin, a silicone resin or an epoxy resin. A compounding amount of such an "other resin" is usually 50% by weight or less, preferably 45% by weight or less, based on the aliphatic polyamide resin (A).

The above-described components and other additives may be compounded in the aliphatic polyamide resin (A) using various known means at any arbitrary stage until immediately before the resin composition is molded to produce a final molded article. The simplest method is such that the polyamide resin is simply dry blended with a polyphenylene ether-based resin, a flame retardant agent and, optionally, an inorganic filler, a mold releasing agent, etc.

A method in which the above dry blended mass is pelletized by melting, mixing and extrusion is also simple and preferred. In performing the melting, mixing and extrusion, particularly stable mixing may be achieved when the polyamide resin, polyphenylene ether-based resin, flame retardant agent and mold releasing agent are fed from a hopper of an extruder at one time, while feeding the inorganic filler from a side feed port.

In an alternate method, a portion of the aliphatic polyamide resin is previously kneaded with the flame retardant agent, etc., to obtain a master batch having greater compounding ratios of the flame retardant agent, etc. The obtained master batch is dry blended with the other components and the blend is molten, mixed and extruded.

A molded article such as an electric or electronic part or an automobile electrical equipment may be prepared by an ordinary method in which the above-described polyamide resin composition in the form of, for example, a dry blend is fed to a molding device such as an injection molding device and is poured in a mold thereof. After cooling, the obtained molded article is taken out of the mold. The polyamide resin composition of the present invention, which has excellent mechanical properties and electrical characteristics, is suitably used for various parts in the electric and electronic fields, such as connecters, breakers, magnet switches, safety breakers connected to electric wirings and ground-fault interrupters, and parts for electrical equipments in the automobile field.

EXAMPLES

The present invention will be described in more detail below by examples. It should be noted, however, that the present invention is not limited to the examples but may be embodied in other forms so far as they do not depart from the gist of the present invention. Properties of the components used and test methods for evaluating the obtained resin compositions are as follows.

Components Used:
Aliphatic Polyamide Resin (A)

(A-1) Polyamide 6 ("NOVAMID (registered trademark) 1015J" produced by Mitsubishi Engineering-Plastics Corporation, viscosity number: 150 ml/g)

(A-2) Polyamide 66 ("ZYTEL FE3218", produced by DuPont, viscosity number: 140 ml/g)

(A-3) Polyamide 6/66 ("NOVAMID (registered trademark) 2015J" produced by Mitsubishi Engineering-Plastics Corporation, viscosity number: 150 ml/g)

Polyphenylene Ether-Based Resin (B)

(B-1) Modified polyphenylene ether (PPE) resin containing 13% by weight of SEBS, which was obtained by the following method.

Using a supermixer, 100 parts by weight of a polyphenylene ether resin, 0.8 part by weight of maleic anhydride (first grade reagent) and 15 parts by weight of a styrene-based resin were thoroughly mixed. The obtained mixture was melt-kneaded with a twin screw extruder "TEX30XCT" produced by The Japan Steel Works Ltd.) and pelletized to obtain the polyphenylene ether-based resin.

Poly(2,6-dimethyl-1,4-phenylene)ether ("PX100L" produced by Polyxylenol Singapore Inc., having an intrinsic viscosity, as measured at a temperature of 30° C. in chloroform, of 0.3 dl/g) was used as the polyphenylene ether resin, while a hydrogenated product of a styrene compound/conjugated diene compound block copolymer ("CLAYTON G1652", produced by Shell Chemical Co., Ltd., number average molecular weight: 49,000) was as the styrene resin.

Flame Retardant Agent (C)

(C-a) Melamine polyphosphate ("MELAPUR 200/70" produced by Ciba Speciality Chemicals, average particle diameter: 5 to 10 μm, phosphorus content: 13% by weight, nitrogen content: about 43% by weight)

(C-b) Aluminum 1,2-ethylmethylphosphinate (number average particle size: 30 to 40 μm, phosphorus content: about 23% by weight) obtained by the following method.

In 6.5 L of water were dissolved 2,106 g (19.5 mol) of ethylmethylphosphinic acid, to which 507 g (6.5 mol) of aluminum hydroxide were added with vigorous stirring. The mixture was heated to 85° C. Then, the mixture was stirred at 80 to 90° C. for 65 hours. The obtained mixture was cooled to 60° C. and filtered under suction. The solid was dried at 120° C. in a vacuum drying cabinet until the weight remained constant to obtain 2,140 g of fine powder. The fine powder was not molten up to 300° C.

(C-c) Zinc borate ("Firebrake 500" produced by Borax Inc., $2ZnO.3B_2O_3$, number average particle size: 7 to 9 μm)

(C-d) Melamine cyanurate ("MX44" produced by Ogaki Chemical Co., Ltd.)

(C'-1) Phosphazene ("SPS-100" produced by Otsuka Chemical Co., Ltd., phosphorus content: about 13.4% by weight) was used as "other flame retardant".

Inorganic Filler (D)

(D-1) Glass fiber ("T289H" produced by Nippon Electric Glass Co., Ltd., mean size (number average fiber length): 3 mm, mean diameter (number average fiber diameter): 10.5 μm, product treated with aminosilane)

(D-2) Wollastonite ("NYAD400-10012", produced by NYCO Inc., mean size (number average fiber length): 30 μm, mean diameter (number average fiber diameter): 8 μm, product treated with aminosilane)

Elastic Polymer (E)

(E-1) Maleic anhydride-modified ethylene-butene copolymer (EBR) ("MODIC AP730T" produced by Mitsubishi Chemical Corporation, glass transition temperature: −70° C. or below, MFR: 2 g/10 min (ASTM D1238, temperature 190° C., load kg), surface hardness: 83 (former JIS K6301, type-A, published May 1, 1995), density: 0.89 g/cm³)

(E-2) Maleic anhydride-modified styrene-ethylene-butadiene-styrene (SEBS) ("TUFTEC M1943" produced by Asahi Kasei Chemicals Corporation, MFR: 8 g/10 min (ASTM D1238, temperature 230° C., load 2.16 kg))

Mold Releasing Agent (F)

(F-1) Calcium montanate ("CAV 102" produced by Clariant Japan K. K.)

(F-2) Carboxylic acid amide type wax ("WH255" produced by Kyoeisha Chemical Co., Ltd.)

Evaluation Method:
[Flame Retardancy]

Flame retardancy was evaluated by a test method in accordance with UL94 standard using a combustion test piece having a size of 5×½×1/32 inch or 5×½×1/16 inch prepared by a method described hereinafter.

[Glow Wire Property]

Glow wire property was measured by a test method in accordance with IEC 60695-2-12 standard using a test piece having a size of 100×100×1.6 mm prepared by a method described hereinafter. A test piece meeting the test standard at 960° C. was rated as "pass".

[Tracking Resistance]

Tracking resistance was measured by a test method in accordance with IEC 60112 standard using a test piece having a size of 100×100×3 mm prepared by a method described hereinafter. The result of the test at an applied voltage of 500 V was rated as "pass" or "fail".

[Mechanical Characteristics]

ISO test piece prepared by a method described hereinafter was subjected to a bending test (test method in accordance with ISO 178 standard) and a Charpy notched impact strength (test method in accordance with ISO 178 standard).

[Mold Deposits]

Pellets of a resin composition obtained by a method described hereinafter were dried at 80° C. for 10 hours and subjected to injection molding over 100 shots to produce combustion test pieces of a 5×½×1/16 (thickness) inch size. After the 100 shots, the mold surface was visually checked for dirt. The injection molding was carried out using an injection molding machine ("J75ED" produced by The Japan Steel Works Ltd.) at a cylinder temperature of 240 to 270° C., a mold temperature of 80° C. and an injection speed of 10 mm/sec with a molding cycle of 35 seconds. The evaluation was rated as follows:

A: No dirt is observed.
B: Slight dirt is observed but is not problematic for ordinary continuous molding.
C: Dirt is so significant that it is impossible to perform continuous molding.

[Appearance of Molded Article]

The 100th shot molded article produced in the above mold deposits test was checked with naked eyes for the presence or absence of defects such as (1) silvering marking due to generation of gases during the injection molding and (2) surface exfoliation due to insufficient compatibility between the polyamide resin and polyphenylene ether-based resin. The evaluation was rated as follows:

A: No defects are found.
B: Defects are so slight that the article is regarded as passing the test as compared with the ordinary molded articles.
C: Defects are so significant that the article is regarded as failing the test as compared with the ordinary molded articles.

[Bleeding-Out]

A combustion test piece of a 1/16 inch thick prepared in the same manner as that in the above flame retardancy test was treated at a temperature of 80° C. under humidity of 95% for 1 week. The presence or absence of components bleeding out on a surface of the molded article was checked with naked eyes. The evaluation is rated as follows.

A: No bleeding-out occurs.
C: Bleeding-out occurs.

[Releasing Property]

Pellets of a resin composition obtained by a method described hereinafter were dried at 80° C. for 10 hours and subjected to injection molding to produce a molded article in the form of a box (bottom face: 100×150 mm, height: 50 mm, thickness: 2 mm). The molded article was evaluated for releasing property in the injection molding process. The injection molding was carried out using an injection molding machine ("J75ED" produced by The Japan Steel Works Ltd.) at a cylinder temperature of 240 to 270° C., a mold temperature of 80° C., an injection speed of 50 mm/sec, an injection pressure of 500 kgf/cm$^2$ and a holding pressure of 300 kgf/cm$^2$ for a holding time of 12 seconds and a cooling time of 20 seconds. The evaluation was rated as follows:

A: Releasability is excellent.
B: Releasability is slightly poor but the releasing operation can be carried out without trouble. Continuous molding can be carried out without any problem.
C: Releasability is so poor that a noticeable mark of an ejector pin is formed in the molded article.

Examples 1 to 13 and Comparative Examples 1 to 13

In the proportions shown in Tables 1 to 4, components other than an inorganic filler (D) were dry blended. Each blend was melt-kneaded with a twin-screw extruder ("TEX30XCT" produced by The Japan Steel Works Ltd., barrel: 13 blocks) at a cylinder temperature of 240 to 270° C. and a screw revolution speed of 200 rpm, and pelletized to obtain pellets of each polyamide resin composition. The inorganic filler (D) was fed to the extruder from the 9th block (counted from the hopper side) in a side-feed mode. The pellets of each resin composition were dried at 80° C. for 10 hours and subjected to injection molding using an injection molding machine ("J75ED" produced by The Japan Steel Works Ltd.) at a cylinder temperature of 240 to 270° C. and a mold temperature of 80° C. to produce test pieces for the above-described measurement of flame retardancy, glow wire property, tracking resistance and mechanical characteristics. Using the obtained test pieces, the above-described tests were performed. The results of the evaluation are shown in Tables 1 to 4.

TABLE 1

| | | | Example | | |
|---|---|---|---|---|---|
| | | | 1 | 2 | 3 |
| A-1 | Polyamide 6 | Parts | 100 | | 40 |
| A-2 | Polyamide 66 | by | | 100 | 60 |
| A-3 | Polyamide 6/66 | weight | | | |
| B-1 | Modified PPE Containing SEBS | | 21 | 21 | 21 |
| C-a | Melamine polyphosphate | | 19 | 19 | 19 |
| C-b | Aluminum phosphinate | | 30 | 30 | 30 |
| C-c | Zinc borate | | 2.6 | 2.6 | 2.6 |
| C-d | Melamine cyanurate | | 7.8 | 7.8 | 7.8 |
| C'-1 | Phosphazene | | | | |
| Total of components C | | | 59.4 | 59.4 | 59.4 |
| D-1 | Glass fiber | | 78 | 78 | 78 |
| D-2 | Wollastonite | | | | |
| E-1 | Acid modified EBR | | | | |
| E-2 | Acid modified SEBS | | | | |
| F-1 | Potassium montanate | | 0.8 | 0.8 | 0.8 |
| F-2 | Carboxylic acid amide | | | | |
| Flame retardancy | 1/32 inch thickness | | V-0 | V-0 | V-0 |
| | 1/16 inch thickness | | V-0 | V-0 | V-0 |
| Glow wire property | GWFI/960° C./1.6 mm thickness | | pass | pass | pass |
| Tracking resistance | 500 V voltage | | pass | pass | pass |
| Mechanical characteristics | Flexural strength | MPa | 219 | 211 | 218 |
| | Flexural modulus of elasticity | GPa | 9.8 | 10.1 | 9.9 |
| | Charpy notched impact strength | kJ/m$^2$ | 11 | 11 | 11 |
| Moldability | Mold deposits | | A | A | A |
| | Molded article appearance | | B | B | B |
| | Bleeding-out | | A | A | A |
| | Releasability | | A | A | A |

| | | | Example | | |
|---|---|---|---|---|---|
| | | | 4 | 5 | 6 |
| A-1 | Polyamide 6 | Parts | | 100 | 100 |
| A-2 | Polyamide 66 | by | | | |
| A-3 | Polyamide 6/66 | weight | 100 | | |
| B-1 | SEBS containing Modified PPE | | 21 | 21 | 2.2 |
| C-a | Melamine polyphosphate | | 19 | 19 | 16 |
| C-b | Aluminum phosphinate | | 30 | 30 | 25 |
| C-c | Zinc borate | | 2.6 | 2.6 | 2.2 |
| C-d | Melamine cyanurate | | 7.8 | 7.8 | 6.5 |
| C'-1 | Phosphazene | | | | |
| Total of components C | | | 59.4 | 59.4 | 49.7 |
| D-1 | Glass fiber | | 78 | 55 | 65 |
| D-2 | Wollastonite | | | 23 | |
| E-1 | Acid modified EBR | | | | |
| E-2 | Acid modified SEBS | | | | |
| F-1 | Potassium montanate | | 0.8 | 0.8 | |
| F-2 | Carboxylic acid amide | | | | |
| Flame retardancy | 1/32 inch thickness | | V-0 | V-0 | V-1 |
| | 1/16 inch thickness | | V-0 | V-0 | V-0 |
| Glow wire property | GWFI/960° C./1.6 mm thickness | | pass | pass | pass |

TABLE 1-continued

| | | | | | |
|---|---|---|---|---|---|
| Tracking resistance | 500 V voltage | | pass | pass | pass |
| Mechanical characteristics | Flexural strength | MPa | 217 | 215 | 220 |
| | Flexural modulus of elasticity | GPa | 9.8 | 9.9 | 10.2 |
| | Charpy notched impact strength | kJ/m² | 11.5 | 5.7 | 9.5 |
| Moldability | Mold deposits | | A | A | B |
| | Molded article appearance | | B | B | A |
| | Bleeding-out | | A | A | A |
| | Releasability | | B | A | A |

TABLE 2

| | | | Example | | | |
|---|---|---|---|---|---|---|
| | | | 7 | 8 | 9 | 10 |
| A-1 | Polyamide 6 | Parts | 100 | 100 | 100 | 100 |
| A-2 | Polyamide 66 | by | | | | |
| A-3 | Polyamide 6/66 | weight | | | | |
| B-1 | SEBS containing Modified PPE | | 2.2 | 2.2 | 2.8 | 2.1 |
| C-a | Melamine polyphosphate | | 16 | 16 | 14 | 15 |
| C-b | Aluminum phosphinate | | 25 | 25 | 21 | 24 |
| C-c | Zinc borate | | 2.2 | 2.2 | 7.0 | 2.1 |
| C-d | Melamine cyanurate | | 6.5 | 6.5 | 8.4 | |
| C'-1 | Phosphazene | | | | | |
| Total of components C | | | 49.7 | 49.7 | 50.4 | 41.1 |
| D-1 | Glass fiber | | 65 | 65 | | 62 |
| D-2 | Wollastonite | | | | 126 | |
| E-1 | Acid modified EBR | | | | | |
| E-2 | Acid modified SEBS | | | | | |
| F-1 | Potassium montanate | | | 0.7 | | |
| F-2 | Carboxylic acid amide | | | | 0.7 | 0.8 | 0.6 |
| Flame retardancy | 1/32 inch thickness | | V-0 | V-1 | V-1 | V-1 |
| | 1/16 inch thickness | | V-0 | V-0 | V-0 | V-0 |
| Glow wire property | GWFI/960° C./1.6 mm thickness | | pass | pass | pass | pass |
| Tracking resistance | 500 V voltage | | pass | pass | pass | pass |
| Mechanical characteristics | Flexural strength | MPa | 220 | 221 | 160 | 219 |
| | Flexural modulus of elasticity | GPa | 10.2 | 10.1 | 10.2 | 10.2 |
| | Charpy notched impact strength | kJ/m² | 9.7 | 9.5 | 4.6 | 10.9 |
| Moldability | Mold deposits | | B | B | A | B |
| | Molded article appearance | | A | A | A | A |
| | Bleeding-out | | A | A | A | A |
| | Releasability | | A | A | A | A |

| | | | Example | | |
|---|---|---|---|---|---|
| | | | 11 | 12 | 13 |
| A-1 | Polyamide 6 | Parts | 100 | 100 | 100 |
| A-2 | Polyamide 66 | by | | | |
| A-3 | Polyamide 6/66 | weight | | | |
| B-1 | SEBS containing Modified PPE | | 1.5 | 1.9 | 1.9 |
| C-a | Melamine polyphosphate | | 17 | 21 | 21 |
| C-b | Aluminum phosphinate | | 27 | 34 | 34 |
| C-c | Zinc borate | | 2.1 | 2.6 | 2.6 |
| C-d | Melamine cyanurate | | 4.6 | 5.7 | 5.7 |
| C'-1 | Phosphazene | | | | |
| Total of components C | | | 50.7 | 63.3 | 63.3 |
| D-1 | Glass fiber | | | | |
| D-2 | Wollastonite | | | | |
| E-1 | Acid modified EBR | | 25 | | |
| E-2 | Acid modified SEBS | | | 25 | |
| F-1 | Potassium montanate | | 0.5 | 0.6 | 0.6 |
| F-2 | Carboxylic acid amide | | | | |
| Flame retardancy | 1/32 inch thickness | | V-0 | V-0 | V-0 |
| | 1/16 inch thickness | | V-0 | V-0 | V-0 |
| Glow wire property | GWFI/960° C./1.6 mm thickness | | pass | pass | pass |
| Tracking resistance | 500 V voltage | | pass | pass | pass |
| Mechanical characteristics | Flexural strength | MPa | 120 | 112 | 113 |
| | Flexural modulus of elasticity | GPa | 3.6 | 3.4 | 3.4 |
| | Charpy notched impact strength | kJ/m² | 0.7 | 3.5 | 4 |
| Moldability | Mold deposits | | B | B | B |
| | Molded article appearance | | A | A | A |
| | Bleeding-out | | A | A | A |
| | Releasability | | A | B | B |

TABLE 3

| | | | Comparative Example | | |
|---|---|---|---|---|---|
| | | | 1 | 2 | 3 |
| A-1 | Polyamide 6 | Parts | 100 | 100 | 100 |
| A-2 | Polyamide 66 | by | | | |
| A-3 | Polyamide 6/66 | weight | | | |
| B-1 | SEBS containing Modified PPE | | | | 4.8 |
| C-a | Melamine polyphosphate | | 14 | 16 | 1.8 |
| C-b | Aluminum phosphinate | | 23 | 25 | 2.0 |
| C-c | Zinc borate | | 2.6 | 2.1 | 0.3 |
| C-d | Melamine cyanurate | | | 6.4 | 0.8 |
| C'-1 | Phosphazene | | | | |
| Total of components C | | | 39 | 49.5 | 4.9 |
| D-1 | Glass fiber | | 60 | 64 | 48 |
| D-2 | Wollastonite | | | | |
| E-1 | Acid modified EBR | | | | |
| E-2 | Acid modified SEBS | | | | |
| F-1 | Potassium montanate | | | | |
| F-2 | Carboxylic acid amide | | | | |
| Flame retardancy | 1/32 inch thickness | | V-1 | V-0 | HB |
| | 1/16 inch thickness | | V-0 | V-0 | HB |
| Glow wire property | GWFI/960° C./1.6 mm thickness | | pass | pass | fail |
| Tracking resistance | 500 V voltage | | pass | pass | pass |
| Mechanical characteristics | Flexural strength | MPa | 211 | 215 | not tested |
| | Flexural modulus of elasticity | GPa | 9.9 | 9.9 | |
| | Charpy notched impact strength | kJ/m² | 7.9 | 7.8 | |
| Moldability | Mold deposits | | C | C | B |
| | Molded article appearance | | A | A | A |
| | Bleeding-out | | C | C | A |
| | Releasability | | A | A | A |

| | | | Comparative Example | | |
|---|---|---|---|---|---|
| | | | 4 | 5 | 6 |
| A-1 | Polyamide 6 | Parts | 100 | 100 | 100 |
| A-2 | Polyamide 66 | by | | | |
| A-3 | Polyamide 6/66 | weight | | | |

TABLE 3-continued

| | | | | | |
|---|---|---|---|---|---|
| B-1 | SEBS containing Modified PPE | | 30 | 36 | 41 |
| C-a | Melamine polyphosphate | | 41 | 21 | |
| C-b | Aluminum phosphinate | | 66 | 34 | |
| C-c | Zinc borate | | 5.6 | 2.9 | 45 |
| C-d | Melamine cyanurate | | 17 | 8.7 | |
| C'-1 | Phosphazene | | | | 41 |
| Total of components C | | | 129.6 | 66.6 | 86 |
| D-1 | Glass fiber | | 111 | 87 | 97 |
| D-2 | Wollastonite | | | | |
| E-1 | Acid modified EBR | | | | |
| E-2 | Acid modified SEBS | | | | |
| F-1 | Potassium montanate | | | | |
| F-2 | Carboxylic acid amide | | | | 1.0 |
| Flame retardancy | 1/32 inch thickness | | V-0 | V-1 | V-0 |
| | 1/16 inch thickness | | V-0 | V-0 | V-0 |
| Glow wire property | GWFI/960° C./1.6 mm thickness | | pass | pass | pass |
| Tracking resistance | 500 V voltage | | pass | fail | fail |
| Mechanical characteristics | Flexural strength | MPa | not tested | not tested | 211 |
| | Flexural modulus of elasticity | GPa | | | 10.1 |
| | Charpy notched impact strength | kJ/m² | | | 11.7 |
| Moldability | Mold deposits | | C | A | A |
| | Molded article appearance | | C | C | C |
| | Bleeding-out | | A | A | C |
| | Releasability | | A | A | C |

TABLE 4

| | | | Comparative Example | | | |
|---|---|---|---|---|---|---|
| | | | 7 | 8 | 9 | 10 |
| A-1 | Polyamide 6 | Parts | 100 | 100 | 100 | 100 |
| A-2 | Polyamide 66 | by | | | | |
| A-3 | Polyamide 6/66 | weight | | | | |
| B-1 | SEBS containing Modified PPE | | 17 | 21 | 2.1 | 2.1 |
| C-a | Melamine polyphosphate | | | | 15 | 24 |
| C-b | Aluminum phosphinate | | | | 24 | 15 |
| C-c | Zinc borate | | 34 | | | |
| C-d | Melamine cyanurate | | | | | |
| C'-1 | Phosphazene | | 17 | 33 | | |
| Total of components C | | | 51 | 33 | 39 | 39 |
| D-1 | Glass fiber | | 72 | 65 | 62 | 62 |
| D-2 | Wollastonite | | | | | |
| E-1 | Acid modified EBR | | | | | |
| E-2 | Acid modified SEBS | | | | | |
| F-1 | Potassium montanate | | | 0.8 | | |
| F-2 | Carboxylic acid amide | | 0.7 | | 0.6 | 0.6 |
| Flame retardancy | 1/32 inch thickness | | V-2 | V-2 | V-2 | V-2 |
| | 1/16 inch thickness | | V-1 | V-0 | V-1 | V-1 |
| Glow wire property | GWFI/960° C./1.6 mm thickness | | fail | fail | fail | fail |
| Tracking resistance | 500 V voltage | | fail | fail | fail | fail |
| Mechanical characteristics | Flexural strength | MPa | 210 | 210 | not tested | not tested |
| | Flexural modulus of elasticity | GPa | 9.9 | 9.9 | | |
| | Charpy notched impact strength | kJ/m² | 11.9 | 12 | | |
| Moldability | Mold deposits | | A | A | C | C |
| | Molded article appearance | | C | C | B | B |
| | Bleeding-out | | C | C | C | C |
| | Releasability | | C | C | A | A |

| | | | Comparative Example | | |
|---|---|---|---|---|---|
| | | | 11 | 12 | 13 |
| A-1 | Polyamide 6 | Parts | 100 | 100 | 100 |
| A-2 | Polyamide 66 | by | | | |
| A-3 | Polyamide 6/66 | weight | | | |
| B-1 | SEBS containing Modified PPE | | 2.6 | | |
| C-a | Melamine poly phosphate | | 21 | 17 | 21 |
| C-b | Aluminum phosphinate | | 31 | 29 | 33 |
| C-c | Zinc borate | | 26 | 2.1 | 2.6 |
| C-d | Melamine cyanurate | | | 4.5 | 5.6 |
| C'-1 | Phosphazene | | | | |
| Total of components C | | | 78 | 52.6 | 62.2 |
| D-1 | Glass fiber | | 77 | | |
| D-2 | Wollastonite | | | | |
| E-1 | Acid modified EBR | | | | 25 |
| E-2 | Acid modified SEBS | | | | |
| F-1 | Potassium montanate | | | 0.5 | 0.6 |
| F-2 | Carboxylic acid amide | | | | |
| Flame retardancy | 1/32 inch thickness | | V-2 | V-0 | V-0 |
| | 1/16 inch thickness | | V-1 | V-0 | V-0 |
| Glow wire property | GWFI/960° C./1.6 mm thickness | | fail | pass | pass |
| Tracking resistance | 500 V voltage | | pass | pass | pass |
| Mechanical characteristics | Flexural strength | MPa | not tested | 120 | 110 |
| | Flexural modulus of elasticity | GPa | | 3.7 | 3.4 |
| | Charpy notched impact strength | kJ/m² | | 0.5 | 2 |
| Moldability | Mold deposits | | B | C | C |
| | Molded article appearance | | C | A | A |
| | Bleeding-out | | A | C | C |
| | Releasability | | A | B | B |

Tables 1 to 4 show the following.

(1) The resin compositions of Examples 1 to 13 have excellent flame retardancy, tracking resistance, glow wire property and mechanical characteristics, showing much reduced mold deposits during the molding operation and give molded articles with good appearance. Also, the resin compositions do not cause bleeding-out and are excellent in long-term preservation. Especially the resin compositions containing calcium montanate as a component of the mold releasing agent exhibited a flame rating, as measured in accordance with UL94 standard, of V-0 when molded into an article having a thickness of 1/32 inch.

Resin compositions in which no polyphenylene ether-based resin (B) was compounded showed mold deposits, bleeding-out and reduced impact resistance (Comparative Examples 1, 2, 12 and 13). The composition in which the compounding amount of the polyphenylene ether-based resin (B) exceeded the range specified in the present invention failed the tracking resistance test at an applied voltage of 500V and gave molded articles with poor appearance (Comparative Examples 5 and 6).

When the compounding amount of the flame retardant agent (C) was less than the range specified in the present invention, the desired flame retardancy and glow wire property were not able to be achieved (Comparative Example 3). When the compounding amount of the flame retardant agent (C) exceeded the range specified in the present invention, the resulting composition was unsatisfactory with respect to mold deposits and appearance of the molded article (Comparative Example 4).

When other flame retardant agents than (C) were used, it was not possible to obtain satisfactory results in all the flame retardancy, tracking resistance and appearance of molded article even when the amount of the flame retardant agent fell within the scope of the present invention. Further, even when the polyphenylene ether resin which falls within the scope of the present invention was used, it was found that the phenomena of mold deposits and bleeding-out were not sufficiently prevented and that the appearance of the molded article was deteriorated. Especially when phosphazene was used as a flame retardant, releasability in the injection molding was poor and, thus, the moldability was poor (Comparative Examples 6 to 10).

When the components (a), (b) and (c) of the flame retardant agent (C) did not fall within the blending weight ratio range specified in the present invention, the flame retardancy was unsatisfactory and, further, the glow wire property and appearance of the molded article were deteriorated (Comparative Example 11).

As described in the foregoing, the resin composition according to the present invention is excellent in flame retardancy, tracking resistance, glow wire property and mechanical characteristics, shows much reduced mold deposits during molding operation, exhibits excellent moldability, gives molded articles with good appearance, hardly causes bleeding-out and is stable for a long period of time. Therefore, the composition is considered to be useful as electric and electronic parts, particularly as cases of safety breakers and ground-fault interrupters, and as parts for automobile electrical equipments.

The invention claimed is:

1. A flame retardant polyamide resin composition comprising 100 parts by weight of an aliphatic polyamide resin (A) having a viscosity number of 70 to 200 ml/g, 0.1 to 2.8 parts by weight of a polyphenylene ether-based resin (B), and 5 to 100 parts by weight of a flame retardant agent (C) comprising at least the following components (a), (b) and (c):

(a) a reaction product of a melamine and a phosphoric acid, (b) a phosphinic acid salt represented by the general formula (I) shown below and/or a diphosphinic acid salt represented by the general formula (II) shown below, and (c) a metal salt of boric acid, wherein a compounding weight ratio (a):(b):(c) of the flame retardant agent components is 1:(0.5 to 2.5):(0.01 to 1),

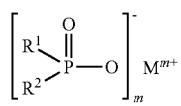 (I)

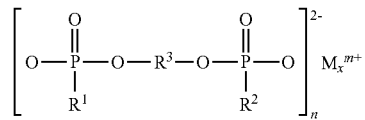 (II)

(wherein $R^1$ and $R^2$ are the same or different and each represent linear or branched $C_1$ to $C_6$ alkyl and/or $C_6$ to $C_{10}$ aryl, $R^3$ represents linear or branched $C_1$ to $C_{10}$ alkylene, $C_7$ to $C_{10}$ arylene, $C_7$ to $C_{10}$ alkylarylene or $C_7$ to $C_{10}$ arylalkylene, M is Ca, Mg, Al or Zn, m is a valence of M, n is 1 or 3 and x is 1 or 2, with the proviso that 2n=mx), and wherein the flame retardant polyamide resin composition passes the tracking resistance test performed in accordance with IEC 60112 standard at an applied voltage of 500 V when molded into an article having a thickness of 3 mm.

2. A flame retardant polyamide resin composition according to claim 1, wherein the flame retardant agent (C) further comprises, in addition to the components (a), (b) and (c), (d) a melamine cyanurate compound and wherein a compounding weight ratio (a):(b):(c):(d) of the flame retardant agent components is 1:(0.5 to 2.5):(0.01 to 1):(0.02 to 2).

3. A flame retardant polyamide resin composition according to claim 1, wherein the aliphatic polyamide resin (A) is polyamide 6, polyamide 66, a copolymer of thereof, or a mixture comprising at least 80% by weight of these polyamide resins.

4. A flame retardant polyamide resin composition according to claim 1, wherein the polyphenylene ether-based resin (B) is modified with an unsaturated carboxylic acid, an unsaturated carboxylic anhydride or an acid halide, amide, imide or a $C_1$ to $C_{20}$ alkyl or glycol ester thereof.

5. A flame retardant polyamide resin composition according to claim 1, wherein the polyphenylene ether-based resin (B) comprises 1 to 80% by weight of a styrene-based resin.

6. A flame retardant polyamide resin composition according to claim 5, wherein the styrene-based resin is modified with an unsaturated carboxylic acid, an unsaturated carboxylic anhydride or an acid halide, amide, imide or a $C_1$ to $C_{20}$ alkyl or glycol ester thereof.

7. A flame retardant polyamide resin composition according to claim 1, further comprising an inorganic filler (D) in an amount of 5 to 150 parts by weight per 100 parts by weight of the aliphatic polyamide resin (A).

8. A flame retardant polyamide resin composition according to claim 7, wherein the inorganic filler (D) is a glass-based filler and/or a calcium silicate-based filler.

9. A flame retardant polyamide resin composition according to claim 1, further comprising an elastic polymer (E) in an amount of 1 to 40 parts by weight per 100 parts by weight of the aliphatic polyamide resin (A).

10. A flame retardant polyamide resin composition according to claim 9, wherein the elastic polymer (E) is an ethylene-α-olefin-based copolymer and/or a hydrogenation product of a block copolymer comprising a styrene compound polymer block (a) and a conjugated diene compound polymer block (b).

11. A flame retardant polyamide resin composition according to claim 9, wherein the elastic polymer (E) is modified with an unsaturated carboxylic acid, an unsaturated carboxylic anhydride or an acid halide, amide, imide or a $C_1$ to $C_{20}$ alkyl or glycol ester thereof.

12. A flame retardant polyamide resin composition according to claim 1, further comprising a mold releasing agent (F) in an amount of 0.001 to 3 parts by weight per 100 parts by weight of the aliphatic polyamide resin (A).

13. A flame retardant polyamide resin composition according to claim 12, wherein the mold releasing agent (F) is a metal salt of an aliphatic carboxylic acid and/or a carboxylic acid amide-based wax.

14. A flame retardant polyamide resin composition according to claim 1, which exhibits flame ratings, as measured in accordance with UL94 standard, of V-0 when molded into an article having a thickness of 1/16 inch and V-0 or V-1 when molded into an article having a thickness of 1/32 inch, and which passes the glow wire test performed in accordance with IEC 60695-2-12 standard at 960° C. when molded into an article having a thickness of 1.6 mm.

15. A molded article comprising a flame retardant polyamide resin composition as claimed in claim 1.

16. A molded article according to claim 15 which is a part for an electric or electronic equipment.

17. A molded article according to claim 15 which is a part for an automobile electrical equipment.

18. A molded article according to claim 16 which is a breaker case.

* * * * *